United States Patent
Bailey et al.

(10) Patent No.: US 7,680,811 B2
(45) Date of Patent: Mar. 16, 2010

(54) SET BASED DATA STORE

(75) Inventors: Stuart M. Bailey, Mountain View, CA (US); Ivan W. Pulleyn, Sunnyvale, CA (US)

(73) Assignee: Infoblox Inc., Santa Clara, CA (US)

( * ) Notice: Subject to any disclaimer, the term of this patent is extended or adjusted under 35 U.S.C. 154(b) by 79 days.

(21) Appl. No.: 11/097,108

(22) Filed: Mar. 31, 2005

(65) Prior Publication Data

US 2006/0041578 A1    Feb. 23, 2006

Related U.S. Application Data

(60) Provisional application No. 60/591,821, filed on Jul. 27, 2004, provisional application No. 60/562,739, filed on Apr. 16, 2004.

(51) Int. Cl.
*G06F 7/00* (2006.01)
*G06F 17/00* (2006.01)

(52) U.S. Cl. .................................. 707/102; 707/103 Y

(58) Field of Classification Search ............... 707/1–10, 707/100–104.1, 200–206
See application file for complete search history.

(56) References Cited

U.S. PATENT DOCUMENTS

| | | | | |
|---|---|---|---|---|
| 5,546,571 | A * | 8/1996 | Shan et al. | 707/3 |
| 5,742,809 | A * | 4/1998 | Hayashi et al. | 707/2 |
| 6,516,320 | B1 * | 2/2003 | Odom et al. | 707/101 |
| 6,711,562 | B1 * | 3/2004 | Ross et al. | 707/3 |
| 2001/0007987 | A1 * | 7/2001 | Igata | 707/3 |

OTHER PUBLICATIONS

Lee et al., Semantic and structural query reformulation for efficient manipulation of very large knowledge bases, Oct. 31-Nov. 2, 1990, IEEE, 369-374.*
Cheiney et al., Relational storage and efficient retrieval of rules in a deductive DBMS, Feb. 6-10, 1989, IEEE, 644-651.*

* cited by examiner

*Primary Examiner*—Jean B Fleurantin
(74) *Attorney, Agent, or Firm*—Van Pelt, Yi & James LLP

(57) ABSTRACT

Storing data in a data store is disclosed, including storing data in a plurality of generalized memory structures and generating an indexing structure that references one or more of the memory structures. Referencing is based on rules expressed in the memory structures. Processing a query in a data store is disclosed, including receiving a query, selecting an appropriate indexing structure to access for the query, and accessing data using the selected indexing structure.

31 Claims, 8 Drawing Sheets

```
<structure zone>
    <member name string>
    <member zone ref>
    <key zone, name ".">
</structure>
```
— 404

```
<structure network>
    <member number int>
    <member network ref>
    <key network, number ".">
</structure>
```
— 408

```
<structure host>
    <member name string>
    <member zone ref>
    <member number int>
    <member network ref>
    <key1 name, zone ".">
    <key2 network, number ".">
</structure>
```
— 412

FIG. 4

Host Table

| .com.infoblox.www | .10.0.5.6 | 4 |
|---|---|---|

708

Zone Table

| .com.infoblox | 0 |
|---|---|
| .com | 1 |
| .com.companyname | 5 |

712

Network Table

| .10.0.5 | 2 |
|---|---|
| .10.0 | 3 |
| .10.0.8 | 6 |

SET BASED DATA STORE

CROSS REFERENCE TO RELATED APPLICATIONS

This application claims priority to U.S. Provisional Patent Application No. 60/591,821 entitled SET BASED DATA STORE filed Jul. 27, 2004, which is incorporated herein by reference for all purposes, and to U.S. Provisional Patent Application No. 60/562,739 entitled MANAGING NETWORK IDENTITY INFRASTRUCTURE filed Apr. 16, 2004, which is incorporated herein by reference for all purposes.

FIELD OF THE INVENTION

The present invention relates generally to data storage. More specifically, a set based data store is disclosed.

BACKGROUND OF THE INVENTION

Data stores are used in conjunction with numerous computer applications, including network applications such as DNS servers, GUI management programs, server monitors, and process monitors. A data store, as used herein, refers to any memory that may be used for storing data, including manual files, machine readable files, and databases. A data store may be organized in various ways, including as a relational, hierarchical, or object-oriented data store. For example, a relational data store may be best suited to an application that views data relationally. There may be applications where it is desirable to view data both relationally and hierarchically, such as in the system described in U.S. patent application Ser. No. 10/866,307 entitled MAINTAINING DATA INTEGRITY IN A DISTRIBUTED ENVIRONMENT filed Jun. 10, 2004, which is incorporated herein by reference for all purposes.

Typically, data organized relationally is difficult to view hierarchically, and vice versa. It would be useful to have a data store in which data can be efficiently viewed in various ways.

BRIEF DESCRIPTION OF THE DRAWINGS

Various embodiments of the invention are disclosed in the following detailed description and the accompanying drawings.

FIG. 4 is an example of RTXML code that defines three generalized memory structures.

FIG. 7 is a logical diagram illustrating a relational view of data in a data store.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

A set based data store is disclosed. A set based data store stores data in an amorphous form, such as in a plurality of generalized memory structures. Various indexing structures may be generated that reference the generalized memory structures. A query may be processed by selecting an appropriate indexing structure to access for the query.

Figure 1:
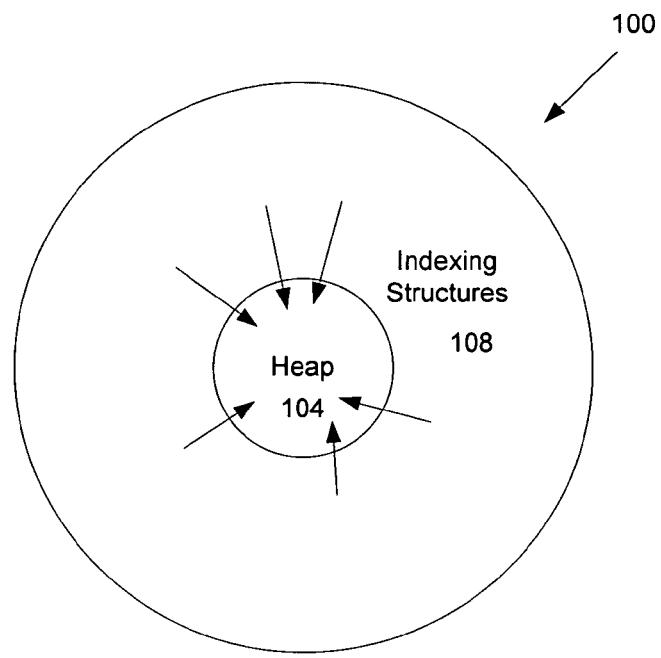
FIG. 1 is a diagram of a set based data store.

FIG. 1 is a diagram of a set based data store 100. Data store 100 is shown to include indexing structures 108 surrounding heap 104. Data is stored in heap 104 in a plurality of generalized memory structures. An application accesses data in heap 104 by accessing indexing structures 108. Indexing structures 108 reference data within heap 104. For example, indexing structures 108 may include pointers to generalized memory structures within heap 104.

Figure 2A:
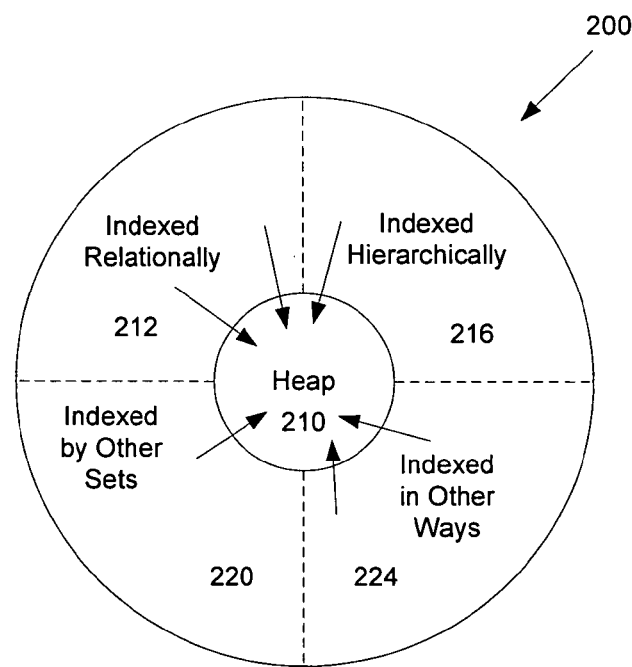
FIG. 2A is a diagram of a data store.

FIG. 2A is a diagram of a data store 200. Data store 200 is shown to include various indexing structures 212, 216, 220, and 224 surrounding heap 210. Data is stored in heap 210 in a plurality of generalized memory structures. An application accesses data in heap 210 by accessing one of indexing structures 212, 216, 220, and 224. Indexing structures 212, 216, 220, and 224 reference data within heap 210. For example, indexing structures 212, 216, 220, and 224 may include pointers to generalized memory structures within heap 210. Indexing structures 212 are organized relationally; indexing structures 216 are organized hierarchically; indexing structures 220 are organized according to various other sets; and indexing structures 224 are organized in other ways, such as as objects in an object oriented data store. Applications that may access indexing structures 212 include scripting languages, such as SQL. Applications that may access indexing structures 216 include DNS servers and GUI management programs.

Figure 2B:
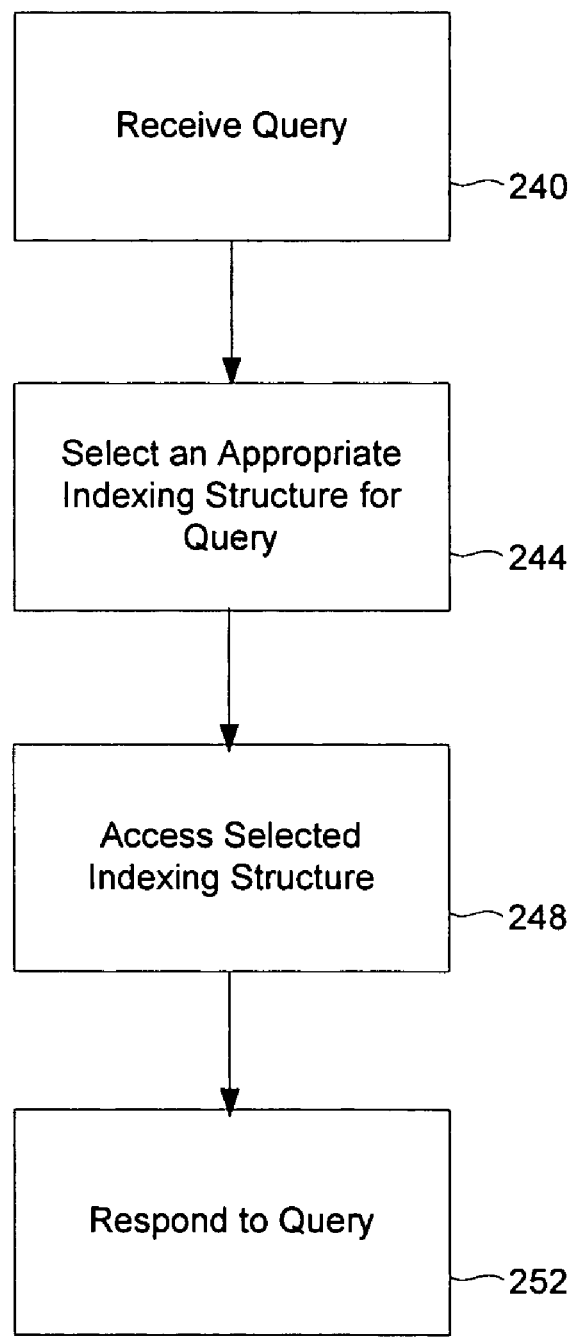
FIG. 2B is a flowchart illustrating a method of processing a query in a data store.

FIG. 2B is a flowchart illustrating a method of processing a query in a data store, such as data store 200. A query is received (244). For example, the query may be a select query (accesses data in the data store) or an action query (modifies data in the data store). The query may come from an application, such as a DNS server or a scripting language. An appropriate indexing structure is selected for the query (248). A request may be more efficiently processed using a particular indexing structure. For example, a request to view all of certain type of record, may be best processed using a relational indexing structure. The selected indexing structure is accessed (212). Data in the heap is accessed using the selected indexing structure. A response to the query is made (216). For example, data or an indication that the query was successfully processed may be returned.

Figure 3:
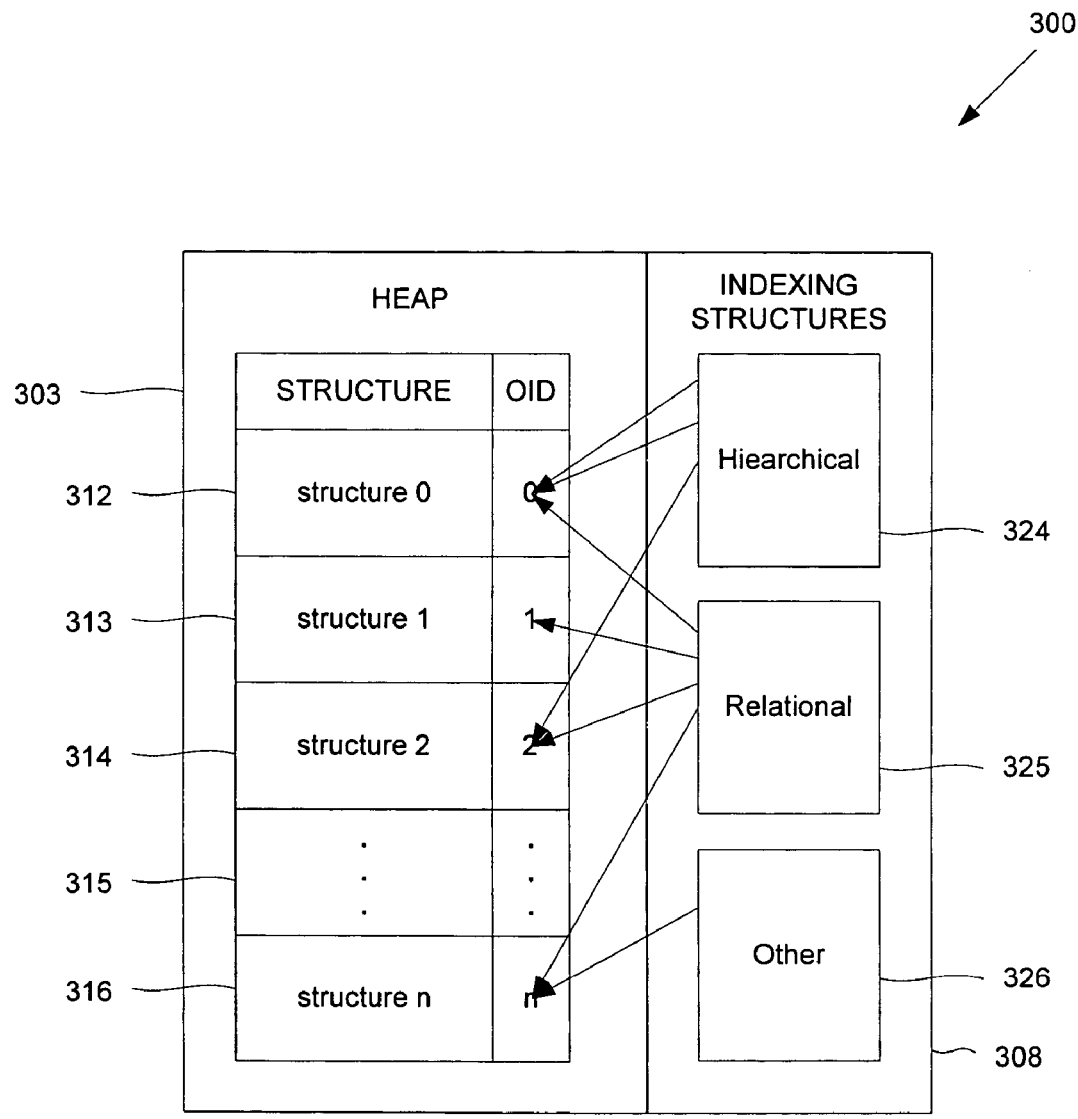
FIG. 3 is a diagram illustrating a data store.

FIG. 3 is a diagram illustrating a data store 300. Data store 300 is shown to include a heap 303 and indexing structures 308. Heap 303 includes generalized memory structures 312-216 each associated with an object identifier (OID), a unique identifier of the structure. Each structure includes a set of name, value pairs. Indexing structures include hierarchical indexing structures 324, relational indexing structures 325, and other indexing structures 326. Each indexing structure 324-326 references structures within heap 303. For example, hierarchical indexing structures 324 reference structures 312 and 314 by their OID numbers. Similarly, relational indexing structures 325 and other indexing structures 326 reference structures by their OID numbers.

In some embodiments, the generalized memory structures are defined using a structured language. In one embodiment, the structured language is derived from XML and is a referred to as Runtime Extensible Markup Language or RTXML. FIG. 4 is an example of RTXML code that defines three generalized memory structures. In this example, generalized memory structures 404, 408, and 412 each include sets of name, value pairs, including one or more members and keys. A key is a unique identifier associated with a structure. For example, zone structure 404 includes two members and a key. The first member is "name", which is a string. The second member is "zone", which is a ref. A ref is a reference to another structure, such as a key of the other structure. In this example, the member "zone" is a reference ("ref") to the key of another zone structure. The key associated with structure 404 is a concatenation of the zone, ".", and the name. A structure may have two keys. For example, host structure 412 is shown to have four members (two that are refs) and two keys.

Figure 5:
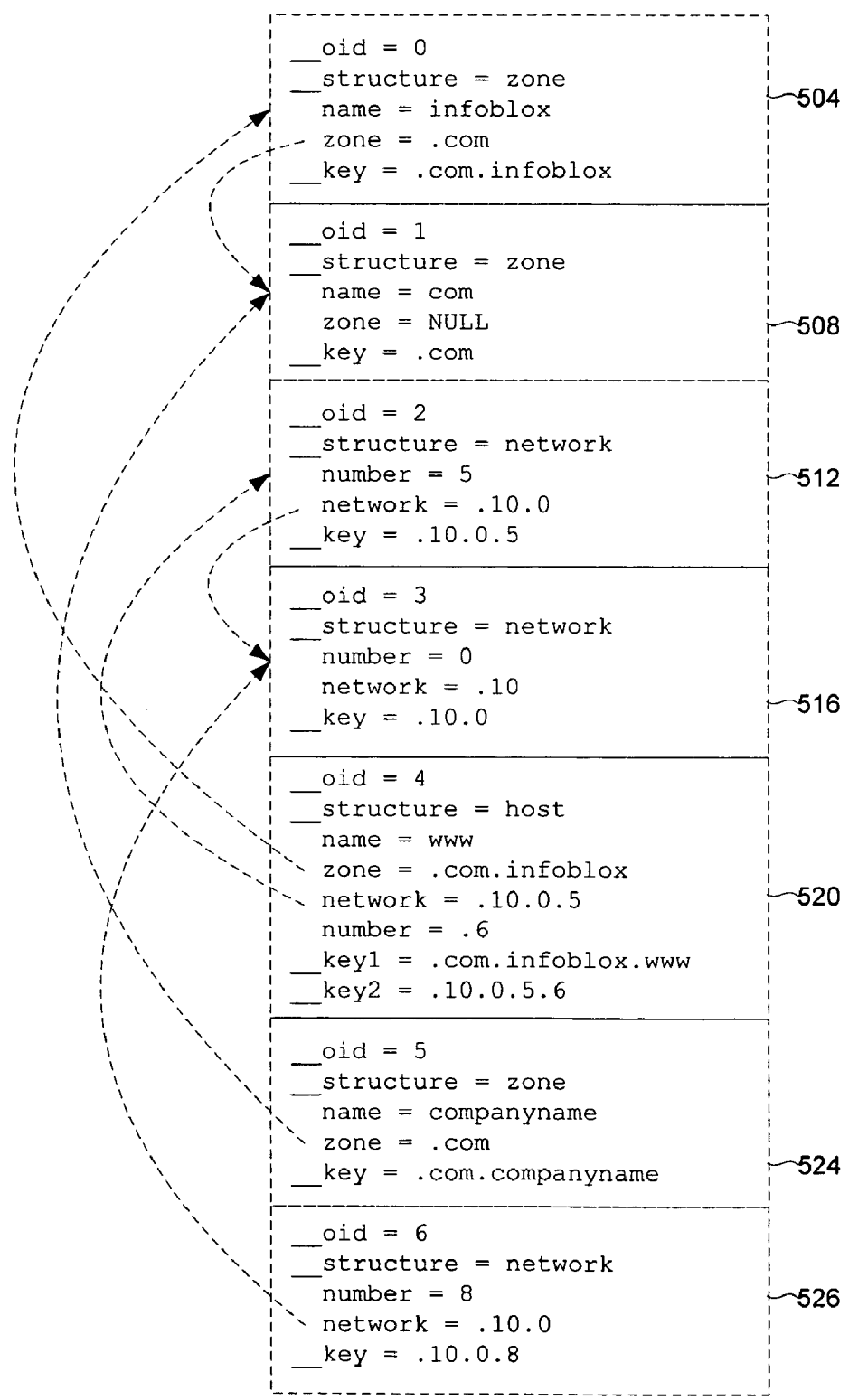
FIG. 5 is an example of data stored in generalized memory structures within a heap.

FIG. 5 is an example of data stored in generalized memory structures within a heap, such as heap 303. In this example, structures 504, 508, and 524 are zone structures, structures 512, 516, and 526 are network structures, and structure 520 is a host structure. A member of a structure may reference another structure by a key associated with the referenced structure. For example, zone structure 504 has zone ".com". The zone structure with key ".com" is zone structure 508. As shown by an arrow, zone structure 504 references zone structure 508.

The refs provide a way to express relationship rules between various structures. Rather than storing the structures in an organization that define the rules, the structures are stored in an amorphous form, where each structure includes all the information needed to define the rules and construct any views that may be desired.

As shown, each of generalized memory structures 504-524 is assigned an OID. In some embodiments, the indexing structures reference the generalized memory structures by their OIDs. The indexing structures may include hierarchical indexing structures to view the data hierarchically, and relational indexing structures to view the data relationally.

Figure 6:
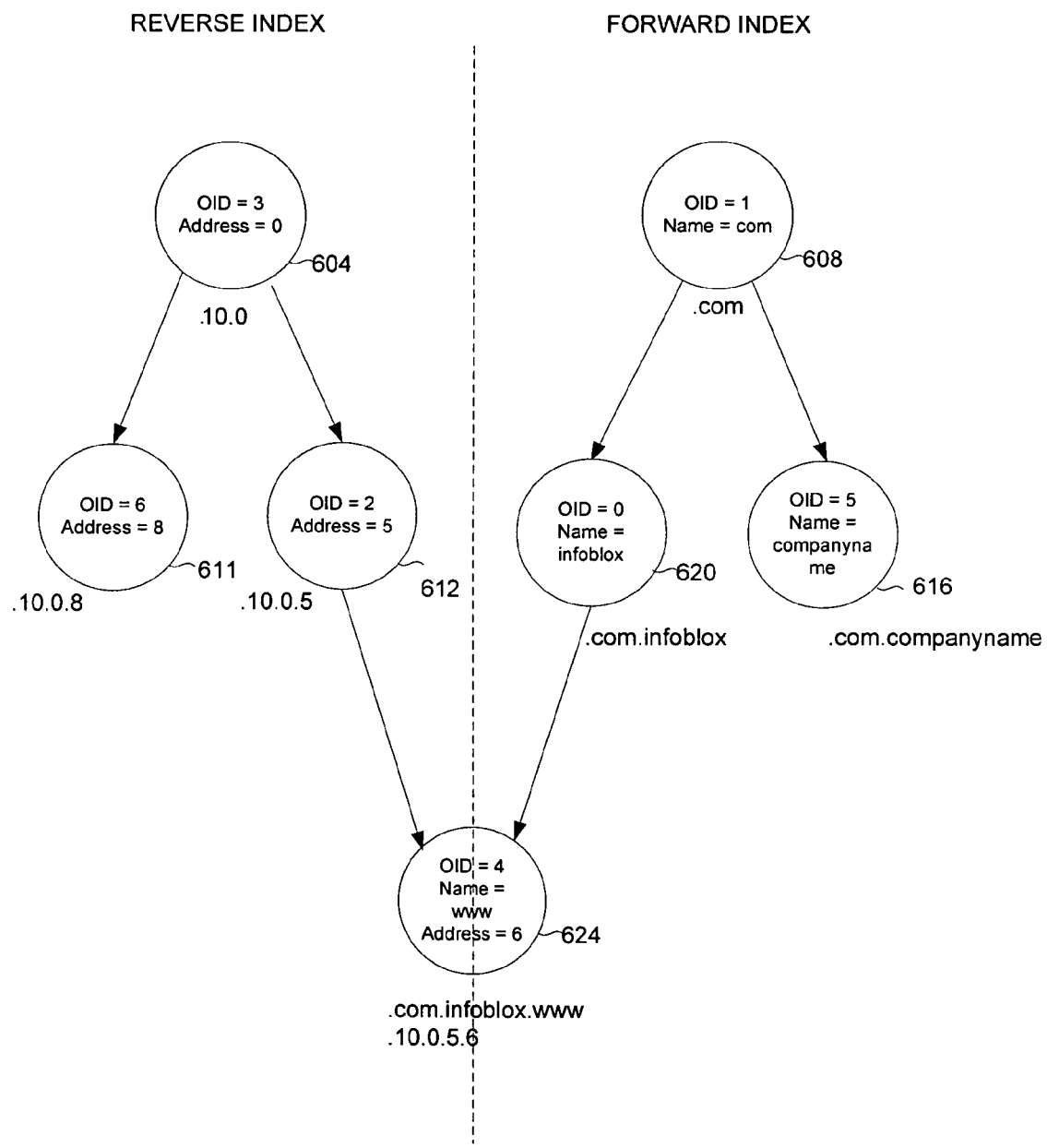
FIG. 6 is a logical diagram illustrating a (double) hierarchical view of data in a data store.

FIG. 6 is a logical diagram illustrating a (double) hierarchical view of data in a data store. In this example, the generalized memory structures shown in FIG. 5 are organized hierarchically according to the refs associated with each structure. Each generalized memory structure is represented by a node and each node points to the node(s) that it references. As shown, the structure forms a double tree. Nodes 608, 616, 620, and 624 form a reverse tree and nodes 604, 611, 612, and 624 form a forward tree. The reverse tree provides an IP address to domain name mapping. The forward tree provides a domain name to IP address mapping. The structure forms a Hasse diagram since there are no circular dependencies between nodes (i.e., there are no circular paths in the structure)

FIG. 7 is a logical diagram illustrating a relational view of data in a data store. In this example, the generalized memory structures shown in FIG. 5 are organized relationally into tables. Host table 708 includes all host structures, zone table 712 includes all zone structures, and network table 714 includes all network structures.

Figure 8:
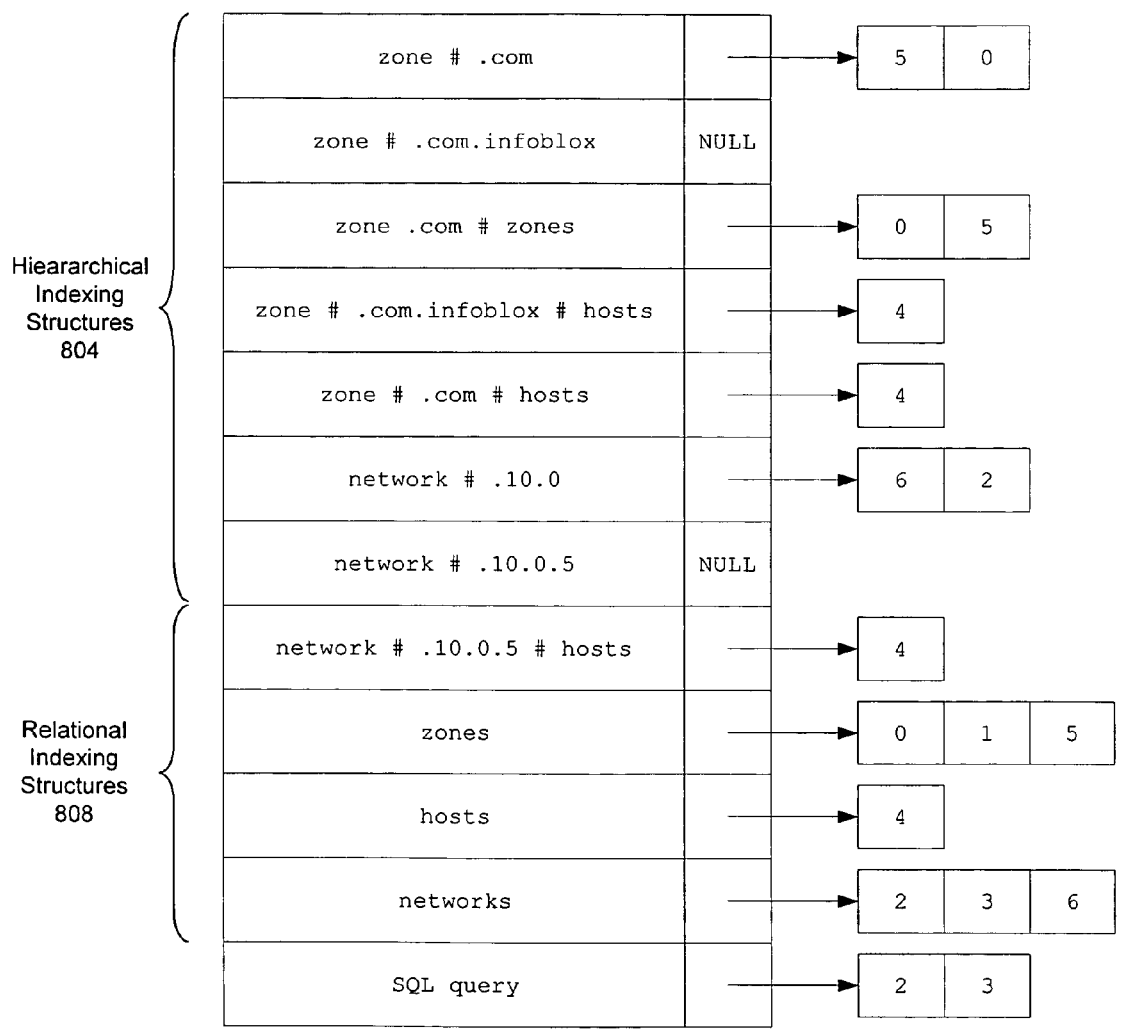
FIG. 8 is an example of a hash table of indexing structures.

In some embodiments, the indexing structures are stored in a hash table, where the hash keys are indexing structures and the hash values are lists of OIDs that belong to that indexing structure. FIG. 8 is an example of a hash table of indexing structures for the generalized memory structures shown in FIG. 5. Indexing structures 804 are hierarchically indexed and indexing structures 808 are relationally indexed. Each indexing structure hashes to a list of OIDs. For example, set "zone # .com" is the set of all zones with refs to ".com", or OIDs 0 and 5. Set "zone #.com.infoblox # hosts" is the set of all hosts in zone ".com.infoblox", or OID 4. Set "network # .10.0.5" is the set of all networks with refs to ".10.0.5", which is NULL since there are no networks with refs to ".10.0.5". Using these indexing structures, the hierarchical view shown in FIG. 6 or the relational view shown in FIG. 7 can be quickly constructed. The indexing structures provide a way to quickly access the data in the heap by referencing the OIDs of structures in the heap.

Each indexing structure is a set of generalized memory structures. As such, set operations between indexing structures can be quickly performed by comparing lists of OIDs. For example, a query for all hosts in zone ".com" but not in zone ".com.infoblox". results in the set of OIDs listed in zone ".com" but not in zone ".com.infoblox".

The indexing structures may be manually or automatically configured. The indexing structures may be preconfigured or change with time. For example, an SQL query that is frequently used may be indexed. An indexing structure that is infrequently used may be removed.

FIG. 8 is an example of a hash table of indexing structures. Different hash tables may include a larger or smaller number of indexing structures. Indexing structures may be stored in multiple hash tables or in a structure other than a hash table.

The data store examples described herein are especially useful for highly collaborative, distributed applications. In some embodiments, the data store can be viewed as a multi-ontology semantic distributed data store that supports multiple views or ontologies. In such embodiments, the layout of the data in storage is not type specific and there is no canonical typing of data. The data store does not need to be performance bound to a particular view.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of processing a query in a data store, comprising:
   receiving a query;
   selecting, from a plurality of indexing structures, wherein each of the plurality of indexing structures references one or more generalized memory structures and each of the plurality of indexing structures is associated with a different organization of the data store, an indexing structure associated with a particular organization of the data store to access for the query;

processing the query at least in part by accessing data using the selected indexing structure; and storing a plurality of generalized memory structures and the plurality of indexing structures;

wherein at least two of the plurality of indexing structures references one or more of the same generalized memory structures in the plurality of generalized memory structures, wherein referencing is based on rules expressed in the generalized memory structures.

2. A method as recited in claim 1, further including responding to the query based on the accessed data.

3. A method as recited in claim 1, wherein accessing includes modifying data.

4. A method as recited in claim 1, wherein the selected indexing structure references a generalized memory structure within the data store.

5. A method as recited in claim 1, wherein the selected indexing structure is a hierarchical structure.

6. A method as recited in claim 1, wherein the selected indexing structure is a referential structure.

7. A method as recited in claim 1, wherein the selected indexing structure is an object.

8. A method as recited in claim 1, wherein the selected indexing structure is stored in a hash table of indexing structures.

9. A method as recited in claim 1, wherein the selected indexing structure includes a list of references.

10. A method as recited in claim 1, wherein the selected indexing structure includes a list of pointers.

11. A method as recited in claim 1, wherein the selected indexing structure includes a list of OIDs.

12. A method as recited in claim 1, wherein the selected indexing structure includes a set.

13. A method as recited in claim 1, wherein at least one of the generalized memory structures includes:
    a name;
        a reference to another structure; and
        a key that uniquely identifies the structure.

14. A structure as recited in claim 13, wherein the reference is to a key of another structure.

15. A structure as recited in claim 13, wherein the name is one of a plurality of names.

16. A structure as recited in claim 13, wherein the reference is one of a plurality of references.

17. A method as recited in claim 1, wherein the particular organization of the data store is a relational organization.

18. A method as recited in claim 1, wherein the particular organization of the data store is a hierarchical organization.

19. A method as recited in claim 1, wherein the particular organization of the data store is an object oriented organization.

20. A method as recited in claim 1, wherein the plurality of generalized memory structures is not organized according to any particular organization of the data store.

21. A method as recited in claim 1, wherein the plurality of generalized memory structures is not organized according to a relational, hierarchical, or object oriented organization of the data store.

22. A method as recited in claim 1, wherein the plurality of generalized memory structures is stored in a heap.

23. A method as recited in claim 1, wherein the plurality of generalized memory structures is stored using an Extensible Markup Language (XML).

24. A system for processing a query in a data store, comprising:
    a processor configured to:
    receive a query;
    select, from a plurality of indexing structures, wherein each of the plurality of indexing structures references one or more generalized memory structures and each of the plurality of indexing structures is associated with a different organization of the data store, an indexing structure associated with a particular organization of the data store to access for the query;
    process the query at least in part by accessing data using the selected indexing structure; and
    store a plurality of generalized memory structures and the plurality of indexing structures;
    a memory coupled with the processor, wherein the memory provides the processor with instructions;
    wherein at least two of the plurality of indexing structures references one or more of the same generalized memory structures in the plurality of generalized memory structures, wherein referencing is based on rules expressed in the generalized memory structures.

25. A system as recited in claim 24, wherein the selected indexing structure references a generalized memory structure within the data store.

26. A system as recited in claim 24, wherein the selected indexing structure is stored in a hash table of indexing structures.

27. A system as recited in claim 24, wherein the selected indexing structure includes a set.

28. A computer program product for processing a query in a data store, the computer program product being embodied in a computer readable storage medium and comprising computer instructions for:
    receiving a query;
    selecting, from a plurality of indexing structures, wherein each of the plurality of indexing structures references one or more generalized memory structures and each of the plurality of indexing structures is associated with a different organization of the data store, an indexing structure associated with a particular organization of the data store to access for the query;
    processing the query at least in part by accessing data using the selected indexing structure; and
    storing a plurality of generalized memory structures and the plurality of indexing structures;
    wherein at least two of the plurality of indexing structures references one or more of the same generalized memory structures in the plurality of generalized memory structures, wherein referencing is based on rules expressed in the generalized memory structures.

29. A computer program product as recited in claim 28, wherein the selected indexing structure references a generalized memory structure within the data store.

30. A computer program product as recited in claim 28, wherein the selected indexing structure is stored in a hash table of indexing structures.

31. A computer program product as recited in claim 28, wherein the selected indexing structure includes a set.

* * * * *